May 22, 1956   R. E. L. VORBURGER ET AL   2,746,565
RAIL LUBRICATING DEVICE MOUNTED ON A VEHICLE RUNNING ON RAILS
Filed June 8, 1950   2 Sheets-Sheet 1
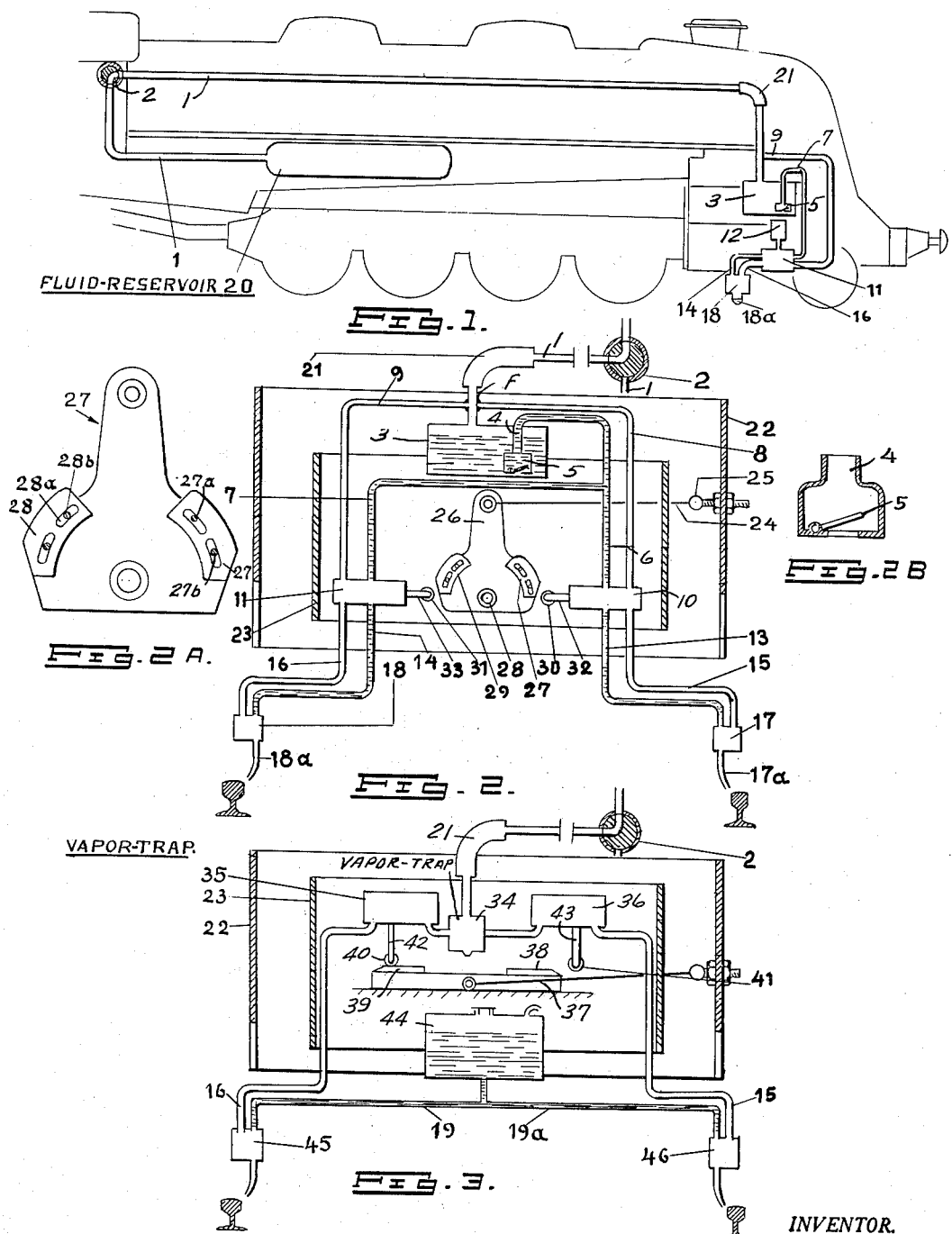
INVENTOR.
RENE ERNEST LUCIEN VORBURGER
ANDRIEN JACQUES MICHEL PIERRE LAFAYE
BY
MAXWELL E. SPARROW
ATTORNEY.

May 22, 1956     R. E. L. VORBURGER ET AL     2,746,565
RAIL LUBRICATING DEVICE MOUNTED ON A VEHICLE RUNNING ON RAILS
Filed June 8, 1950                                        2 Sheets-Sheet 2

INVENTOR.
RENE ERNEST LUCIEN VORBURGER
ADRIAN JACQUES MICHEL PIERRE LAFAYE
BY
MAXWELL E SPARROW.
ATTORNEY.

United States Patent Office 2,746,565
Patented May 22, 1956

2,746,565

RAIL LUBRICATING DEVICE MOUNTED ON A VEHICLE RUNNING ON RAILS

René Ernest Lucien Vorburger and Adrien Jacques Michel Pierre Lafaye, Paris, France, assignors to "Societe de Robinetterie S. A. J.," Paris, France, a company Application June 8, 1950, Serial No. 166,857

Claims priority, application France June 13, 1949

13 Claims. (Cl. 184—3)

Various lubricators for lubricating wheel flanges or rails have been built with the object of decreasing the wear resulting from the friction, along the curves, between the rails and the wheel flanges of the rolling stock. A few apparatuses, called "stationary apparatuses," are installed along the tracks at the particular spots to be lubricated; others, called "moving apparatuses," are mounted on vehicles.

Experience shows that, while the lubricating methods using stationary devices may be useful in particular well defined cases, all methods based on devices mounted on vehicles have a low efficiency and most often give a lubrication which is not consistent with theory owing to the slow and irregular start of the apparatuses, to the distance between the atomizer and the ejector, and also to the fact that the lubricant must travel, any time the lubricator works and before any delivery, over the whole pipe which was partly or entirely emptied after the preceding lubrication. The apparatuses do not work satisfactorily on account of their construction and also of the deteriorations by wear. Furthermore, in practice the lubricating devices for wheel flanges protect only the tires of the wheels to which they are applied, and the ejecting nozzles of the known rail lubricators, which cannot keep a suitable and safe position, even when elastic or retractable devices are added, do not prevent the running surface of the rails from receiving ejected lubricant, which heavily impairs the possibilities of using said lubricators.

The present invention relates to a rail lubricating device which does away with the above mentioned drawbacks. Said lubricator lubricates directly the outside rails of the curves which are the only parts of the track to be lubricated, by ejecting, in properly proportioned quantity, an atomized lubricant over the rounded part and higher part of the inner side of said rails. As a result, it lubricates in an indirect way all wheel flanges which come into contact with said rails. Its use as a lubricator for directly lubricating the wheel flanges does not seem advisable, because such a lubrication is efficient only in the case of the wheel flanges which are lubricated, in spite of the fact that the apparatus is able to give also in this latter case results which are superior to those of known devices.

An object of the present invention is to provide a lubricating device which comprises in combination: means automatically controlled by members actuated by the vehicle running over a curve to immediately, simultaneously and in an independent way distribute at the required rate a lubricant and a motive fluid; means to atomize said lubricant at the discharge end which is adjacent to the rail; and means to continually keep filled up with lubricant the pipe leading to the atomizer, whose instantaneous start is ensured through said distributing means.

Another object of the invention is to provide distributing means which comprise a relay valve operated by said members which are actuated by the vehicle running over a curve, said relay valve being connected to a motive-fluid pipe and adapted to connect said pipe, when it is urged by said actuating members, to a distributor combined with said relay valve, designed and adapted to immediately and simultaneously open fully the pipes of driving fluid and lubricant leading to the atomizer.

A further object of the invention is to provide atomizing means for the lubricant that are made integral with the ejecting member which ejects the atomized lubricant on the portion of the rail to be lubricated.

A still further object of the invention is to provide a closing member which keeps the inlet pipe always filled up with lubricant, in such a manner that the atomized lubricant is instantaneously ejected as soon as the distributor starts.

According to a selected lay-out, the method uses a lubricant sucked into the atomizer-ejector or put under pressure before it is distributed either through the motive fluid or mechanically. As a result, the atomizing and ejecting may be obtained through both combined fluids or only one of them.

The lubricator according to the invention enables very important savings of motive power, rails and wheel tires to be obtained.

Other objects and advantages of the invention will be apparent during the course of the following description.

In the accompanying drawing forming a part of this application and in which like numerals are employed to designate like parts throughout the same, Fig. 1 is a diagrammatic view of a lay-out using a lubricant put under pressure before it is delivered;

Fig. 2 is a side view, on a larger scale, of the same lay-out, showing a form of an automatic control and showing the distributor in section;

Figs. 2A and 2B are details of the check valve and cam;

Fig. 3 is a similar view, showing a device using a lubricant which is not put under pressure before it is delivered, and another automatic control showing the distributor in section;

Figure 4:
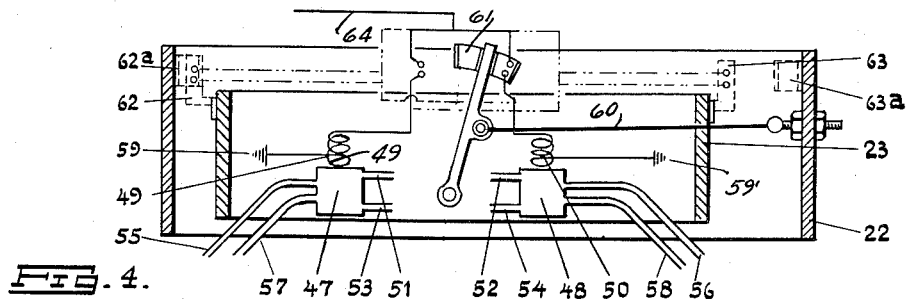
Fig. 4 is a view of another form, comprising an electro-mechanical control of the distributor.

The embodiments illustrated in the drawing include a device according to the invention, mounted on a locomotive, using a lubricant put under pressure before it is delivered, as by means of a motive fluid. Thus, the system according to Figs. 1 and 2 comprises: a supply pipe 1, connected to a source 20 of motive fluid, a three-way cock 2 enabling this source to feed said pipe, or to connect the pipe to the outside atmosphere; a lubricant tank 3 connected to pipe 1, this tank being put under pressure when the cock 2 connects it to the source 20 of motive fluid; a pipe 4 provided at its lower end with a non-return valve 5, carrying the lubricant by means of pipes 6, 7 to distributors 10, 11, respectively connected by pipes 8, 9 to the pipe 1; a mechanical control 12, diagrammatically shown in Fig. 1, for the distributors 10, 11; four delivering pipes 13, 14 for the lubricant, and 15, 16 for the motive fluid; two atomizers-ejectors 17, 18, respectively provided with their ejecting nozzles 17a, 18a; a flexible hose 21 connecting, in the example illustrated, the portion of the pipe for the motive fluid secured to the rigid part 22 (hereinafter called "main frame") of the vehicle to the portion secured to the movable part 23 (hereinafter called "secondary frame") mounted to negotiate the curves; an adjustable connecting rod 24, of a form of automatic control through oscillating motion, which connects a point 25 of the main frame 22 to a cam-carrier 26, on which are adjustably mounted both cams 27, 28. The adjustability of the cams 27 and 28 relative to the carrier 26 is provided by pairs of slits 27a and 28a formed in the respective cams and receiving pairs of spindles 27b and 28b extending from the carrier. Suitable nuts, not shown, are threaded on the spindles 27b and 28b to secure the cams in adjusted position on the cam-carrier. This cam-carrier 26 is rotatably mounted at 29 on the secondary frame 23 and its relative motions may cause the cams to actuate rollers 30, 31, mounted respectively on actuating rods 32, 33 of the distributors. The automatic control is shown in its neutral position.

The arrangement according to Fig. 3, which is a modification of the previous embodiment, is shown in one of the positions corresponding to a discharge over a curve, this being an example of a device using a lubricant not previously put under pressure.

This arrangement, relative to the case of motive fluids submitted to high condensations in operative conditions of the apparatuses, comprises: a steam or vapor trap 34, two distributors 35, 36; another form of automatic control, with a connecting rod 37 and cams 38, 39 which may, in their rectilinear reciprocating movement with respect to the secondary frame 23, actuate the rollers 40, 41 which are rigidly locked to the actuating rods 42, 43 of the distributors; a lubricant tank 44, communicating with the atmosphere, provided with two lubricant pipes 19, 19a, leading directly to the atomizers-ejectors 45, 46. In the case of motive fluids which do not condense in operative conditions, the steam or vapor-trap 34 is not necessary.

Fig. 4 shows, in a position corresponding to a discharge over a curve, an embodiment of electro-mechanical actuating members of the distributors, obtained by translating the mechanical means into electrical components, and comprising: two distributors 47, 48 respectively provided with electro-mechanical relays shown schematically as solenoids 49, 50; motive-fluid inlet pipes 51, 52; lubricant inlet pipes 53, 54; motive-fluid outlet pipes 55, 56; lubricant outlet pipes 57, 58; an automatic control by means of a switch (shown in solid lines) comprising a connecting rod 60 and a switch 61 which, according to a process similar to the mechanical control, may close the circuit energizing either of the solenoids 49, 50; a further alternative automatic control (shown in dots and dashes) through contacts 62, 62a and 63, 63a, which acts as the switch; a main supply 64 and body contacts 59, 59' respectively. Besides the conventional hand-operated devices for breaking the circuit, an automatic device (not shown) may open the circuit in case the vehicles are stopped over a curve.

Figure 5:
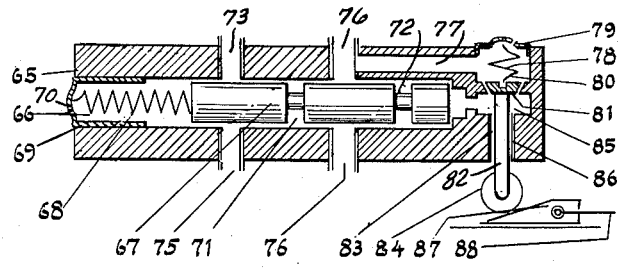
Fig. 5 is a longitudinal sectional view of a form of a distributor provided with a mechanical relay for a lubricant previously put under pressure.
Figures 6, 7:
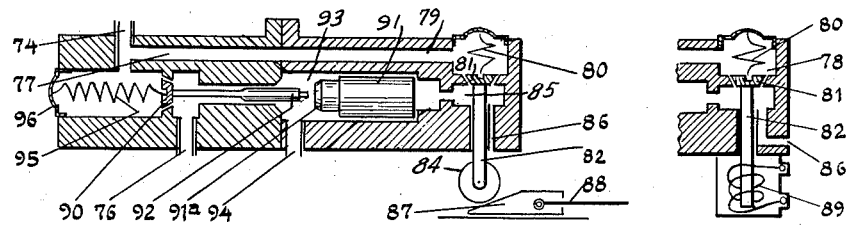
Fig. 6 is a sectional view of an electro-mechanical relay of the distributor.
Fig. 7 is a sectional view of a distributor for a lubricant which is not previously put under pressure.

Details of construction of the distributors 10, 11 (Fig. 2), 35, 36 (Fig. 3) and 47, 48 (Fig. 4) are shown in Figs. 5–7, described hereinafter.

The distributor which has double-acting, very quick-acting mechanical relay (Fig. 5) for lubricants under pressure is adapted for use in the arrangement of Fig. 2 but with a cam of the type shown in Fig. 3, and comprises a body 65 enclosing, in a suitable boring 66, a piston 67. A spring 68, bearing on a cap 69 perforated at 70, urges said piston towards the bottom of the boring. The piston is provided with grooves 71, 72. The body 65 is drilled at 73, 75 and also at 74, 76. The conduit 74 is connected to a relay chamber 78 through a conduit 77. The chamber 78 is closed by a plug 79 acting as a bearing point for a spring 80 which urges a relay-valve 81 upon its seat. The valve-rod 82 passes through a boring 83 and carries at its free end a roller 84. A chamber 85 is connected to the boring 66 and also to the outside atmosphere through a very narrow conduit 86. A cam 87 and a connecting rod 88 show very diagrammatically the actuating members of the distributor.

The distributor with an electro-mechanical relay (Fig. 6) is adapted to be employed in the layout of Fig. 4 and uses, instead of a mechanical relay, an electro-valve 89 which performs the same work. With respect to the other details, it is absolutely identical with the preceding distributor.

When a lubricant is used which is not put under pressure by means of the motive fluid, as in the arrangement of Fig. 3, or is put under pressure by mechanical means, the distributor may be a single-acting distributor.

Such a distributor (Fig. 7) uses as previously a mechanical or electro-mechanical relay, and when the fluid is distributed at high temperature, the inlet device of the piston type may be replaced by a pressure-closed valve 90, which is actuated by two coupled differential pistons 91, 92. The piston 91 acts as a stroke-limiting tight valve, during the opening step, through its front end 91a. The fluid which leaks around the pistons, when the latter are not provided with devices ensuring tightness, is collected in a room 93 connected at 94 to the outside atmosphere. The valve 90 is urged against its seat by means of a spring 95, maintained in position by a plug 96, and thus cuts off, in the position of rest, the fluid inlet 74 with respect to the outlet 76.

It will be appreciated from the foregoing that the distributors of Figs. 2 and 3 may have an internal construction substantially identical with that shown in either Fig. 5 or Fig. 7, with the valve rods 32, 33 and 42, 43 of the former figures controlling relay valves (such as the assembly 79—81) in the manner illustrated in Figs. 5 and 7 for the valve rod 82. Likewise, the movable cores of solenoids 49, 50 in Fig. 4 are functionally equivalent to the rod 82 of Fig. 6, hence the main parts of the distributors 47, 48 may be substantially identical with the left-hand portions of the control mechanisms shown in Figs. 5 and 7.

The atomizer-ejector (Fig. 8) comprises: a body 97 in which are provided a lubricant inlet conduit 98 and a motive-fluid inlet conduit 99; a check-valve 100 (or a closing device of another type, of the ball type for instance) which a spring 101 urges into its seat; a lubricant chamber 102, with convergent combining-tubes 103, 104, for the lubricant, preferably symmetrically arranged in pairs with respect to the axis of the body 97; gauged pulverizing openings 105, 106 for said lubricant; a convergent combining tube 107 for the motive-fluid, a motive nozzle 108, whose section may be controlled by mechanical or thermostatic automatic devices or by hand operated devices; a pulverizing chamber 109, extended by a convergent-divergent passage 110 and ended by an ejecting nozzle 111 provided with a gauged opening 112, which is circular or oblong according to requirements.

The device automatically varying the load on the check-valve 100 (Fig. 9) may comprise a cylinder 113, connected by a conduit 114 to the conduit 99 for the motive fluid. The cylinder 113 contains a piston 115 provided at its lower end with lugs 116 forming a bearing surface for the spring 101. The piston 115 is urged by a spring 117 opposed to and stronger than the spring 101.

The aforesaid device may also be controlled by means of the lowering of pressure produced in the atomizer-ejector by the motive fluid.

In order to be relieved from any lateral contact with the rails, or occasionally with the guard or guide rails, and also from the contacts resulting from the oscillations of level of the road existing at the rail joints, the ejecting nozzle has a very thin shape at its lower portion transversely with respect to the road, its lower end being located above the level of the rails. Most often it is located in the wake of and near a wheel flange.

The almost vertical direction of the lubricant jet is such that the running surface of the rails is never lubricated, because the vertical oscillations of the parts on which the atomizer-ejectors are mounted, which oscillations are the only ones which may take a certain value when the vehicle is running over the curves, have thus a very reduced action on the position of the impact's zone of the jet of atomized lubricant on the rail.

The working of the rail lubricator differs very little whether the lubricant is under pressure or not before being distributed.

The working of the apparatuses of the illustrated examples will be described one after another.

In the case of Figs. 1 and 2, the lubricator being supposed to be ready to work, the lubricant tank is filled up; the cock 2 is open so that the lubricant reaches under pressure the distributor (Fig. 5) at 73, while the motive fluid enters said distributor at 74. This fluid, through the conduit 77, reaches the chamber 78, the valve 81 being between said chamber and chamber 85 which said valve is resting on its seat. The piston 67 is urged towards the right of the boring 66 of the body 65 by means of the spring 68 which bears upon the cap 69, because the chamber 85 communicates with the outside atmosphere through the conduit 86. It is the position of rest, which occurs when the road is straight or shows curves having a large radius. In that case the cam 87 linked to the rod 88 is not in contact with the roller 84. Furthermore the conduits 73, 75, on the one hand, and 74, 76, on the other hand, do not communicate with one another.

As soon as the vehicle enters a curve of a small radius, the cam 87 (Fig. 5) comes into contact with the roller 84 and takes the valve 81 off its seat by means of the rod 82.

The operation of the automatic controls may be understood with the help of Figs. 2, 3, 4. According to the direction of the curve, the concerned portion of the secondary frame 23 is brought near the main frame 22 and takes a position such as shown, for instance, in Fig. 3. The connecting rod 37 then causes the cam-carrier of cams 38, 39 to move as required, that is, in the present case, along a rectilinear path. The same result is obtained in the case of the electric contacts of Fig. 4, which may be provided with travel limiting switches, actuated by springs for instance.

The valve 81 of the distributor (Fig. 5), when lifted from its seat even in a slight way, enables the motive fluid to reach the chamber 85 and the piston 67 moves immediately, compressing the spring 68. When the piston is at the left end of its stroke, the grooves 71, 72 enable the lubricant to pass from bore 73 to bore 75 and the motive fluid from bore 74 to bore 76. The lubricator is then operating. When the curve to be lubricated is negotiated, the frame component members 22, 23 take their initial position again. For instance the cam 87 (or one of the cams 27, 28 of Fig. 2) is drawn aside with respect to the roller 84 (or to one of the rollers 30, 31).

The valve 81 (Fig. 5) falls on its seat again under the action of the spring 80. The motive fluid of the chamber 85 flows slowly out through the conduit 86. The pressure falls down in this chamber and the piston 67, under the action of the spring 68, takes its position of rest again. The connection between the conduits 73, 75 on the one hand, 74, 76 on the other hand is cut, the flows of motive fluid and lubricant simultaneously stop and the lubrication is interrupted.

The operation of the distributor shown in Fig. 7 may be understood with the help of the previous explanation. The difference in the principle of these apparatuses is mostly a result of the fact that the sole fluid, arriving in the case of the distributor of Fig. 7 through the conduit 74, is distributed through the pressure closed valve 90, the two differential pistons 91, 92 acting as servo-motors. The load on the piston 91 is preponderant for actuating the valve.

Figures 8, 9:
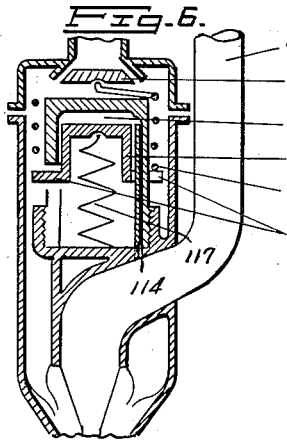
Fig. 8 is a vertical sectional view of a form of an atomizer-ejector.
Fig. 9 is a detailed vertical sectional view of a form of an atomizer-ejector.

Whether or not the fluid is flowing through them, the lubricant pipes connecting the reservoir 3 (Figs. 1, 2) to the atomizers-ejectors 17, 18 are always filled up because they are protected, at the outlet in the reservoir, by means of a check-valve 5 and, at the inlet in the atomizers-ejectors, by means of a check-valve 100 (Fig. 8).

Owing to that fundamental feature, the flow is running as soon as the distributor operates: the check-valve 100 of the corresponding atomizer-ejector is lifted from its seat, the lubricant arrives in the chamber 102 which has in practice very reduced dimensions. Through the convergent combining-tubes 103, 104 it enters the gauged openings 105, 106. It is sucked, projected and stirred up in the pulverizing chamber 109 by the motive fluid arriving from the distributor through the conduit 99, convergent 107 and motive nozzle 108. The pulverized lubricant is then carried by the motive fluid through the convergent-divergent passage 110 down to the ejecting nozzle 111, from which it is ejected through the gauged opening 112 as a powerful, homogeneous jet.

The various required rates of flow are obtained by acting upon one or several factors: nature and pressure of the motive fluid, lubricant's viscosity, cross sections or relative positions of the combining tubes and gauged openings. The variations of the sections may be obtained by changing the nozzles, or by means of adjustable hand-operated devices, needle-valves for instance, or automatic, thermostatic, mechanical devices, the latter being actuated either by the pressure of the motive fluid or by the depression produced in the atomizer-ejector.

The device automatically varying the load of the check-valve 100 (Fig. 9) enables, when the apparatuses are in the position of rest, the exertion of any required pressure on the lubricant's check-valve 100 by means of the spring 101, loaded by the piston 115 under the action of spring 117. But, as soon as the motive fluid arrives through the conduit 114 in cylinder 113, the piston 115 compresses the spring 117 and thus releases the spring 101 whose load on the valve 100 is reduced.

In the modification (of which Fig. 3 is an example), which uses a lubricant that has not previously been put under pressure, the automatic controls are the same as previously described. The lubricant flows owing to gravity from the tank 44 down to the ejectors 45, 46. The carrier of cams 38, 39, actuated by the rod 37, acts through the rollers 40, 41 on the rods 42, 43 of the distributors 35, 36. In certain cases, when the motive fluid produces condensations, a steam or vapor trap 34 may be connected to the pipe at the distributor's inlets. The motive fluid, delivered by the distributors, actuates the atomizers-ejectors as previously described, but with an increased sucking and ejecting power.

The working of the device provided with an electric control according to Fig. 4, wherein one of the distributors is shown in the delivering position, differs from the working of the arrangement of Fig. 2 only by the fact that the distributors are electro-mechanically controlled.

The main features of the lubricator according to the invention, which are definite differences with the main features of the known lubricators, result from the principles which are hereinbefore stated and from the characteristics of the apparatuses. In practice, these features afford the following advantages: an easy and progressive adjustment, obtained by the control through cams provided with movable sectors; an accurate and true adjustment owing to the fact that the distributors are operated by the automatic cam control; a swift working owing to the distributors and to the fact that the lubricant permanently fills the atomizers-ejectors; an accurate ejection owing to the fact that the lubricant jet is almost vertical; a safe working of the nozzles owing to their small dimensions transversely with respect to the road and because they are raised over the rails.

It is obvious that other modifications are possible.

We claim:

1. In a rail-lubricating system for a vehicle comprising a lubricant reservoir, a source of motive fluid, an atomizer-ejector, means for feeding lubricant and motive fluid from said reservoir and said source, respectively, to said atomizer-ejector for discharging said lubricant against a rail, a distributor controlling the discharge of said lubricant, control means for said distributor preventing the discharge of said lubricant except during movement of the vehicle along a curve, said control means being connected to a vehicle part mounted for displacement relative to the vehicle body upon such movement: the combination of said distributor with a relay valve operatively interposed between said control means and said distributor, said valve having a movable element displaceable by said control means; said combination further including first conduit means linking said valve with said source and second conduit means linking said valve with said distributor, said first and second conduit means communicating with each other only in an off-normal position of said movable element; said distributor having a pressure-responsive control member displaceable by said motive fluid from said second conduit means in said off-normal position of said movable element; said distributor being provided with an inlet port connected to said source and with an outlet port connected to said atomizer-ejector, said ports communicating with each other only in an off-normal position of said control member, thereby admitting motive fluid to said atomizer-ejector and enabling the discharge of lubricant therefrom only in an off-normal position of said movable valve element.

2. The combination according to claim 1, wherein the means for feeding lubricant from said reservoir to said atomizer-injector includes a conduit provided at each end with means for maintaining said conduit filled with lubricant while preventing a spontaneous discharge of the latter.

3. The combination according to claim 1, wherein said movable element is provided with cam means mechanically coupled to said control means.

4. The combination according to claim 3, wherein said cam means includes a cam member having a relatively steep ramp followed by an extended dwell, a support for said cam member and means for adjustably mounting said cam member on said support.

5. The combination according to claim 1, wherein said movable element is provided with actuating means electrically controlled from said control means.

6. The combination according to claim 1, wherein said reservoir is connected to a source of pressure, said distributor being provided with an additional inlet port connected to said reservoir and an additional outlet port connected to said atomizer-ejector, said additional ports communicating with each other only in said off-normal position of said control member, thereby admitting lubricant to said atomizer-ejector only in said off-normal position of said movable valve element.

7. The combination according to claim 6, wherein the lubricant in said reservoir is held under pressure from said source of motive fluid.

8. The combination according to claim 6, wherein said control member comprises a piston provided with a pair of channels each adapted to connect one of said inlet ports with a respective one of said outlet ports.

9. The combination according to claim 1, wherein said distributor is provided with a casing also enclosing said relay valve, said inlet port communicating with said first conduit means within said casing.

10. The combination according to claim 1, wherein said distributor is provided with a relatively small piston normally separating said inlet port from said outlet port under pressure from said motive fluid, said control member comprising a relatively large piston adapted to displace said relatively small piston when subjected to pressure from said fluid.

11. The combination according to claim 1, wherein said atomizer-ejector comprises a nozzle body having an entrance opening for said lubricant and a spring-loaded check valve in said entrance opening.

12. The combination according to claim 11, wherein said nozzle body includes a piston for varying the pressure of said check valve, resilient means tending to maintain said piston in a position of relatively high valve pressure, and a fluid chamber adjacent said position, said fluid chamber communicating with said outlet port of said distributor, whereby motive fluid counteracting said resilient means is admitted into said chamber in the off-normal position of said control member and the entrance of lubricant into said nozzle body is facilitated.

13. The combination according to claim 11, wherein said nozzle body is provided with a discharge opening and a constriction between said discharge and entrance openings, there being further provided a tube entering said nozzle body ahead of said constriction and communicating with said outlet port of said distributor.

References Cited in the file of this patent

UNITED STATES PATENTS

| | | |
|---|---|---|
| 830,341 | Love | Sept. 4, 1906 |
| 995,645 | Williams | June 20, 1911 |
| 1,167,514 | Olsen | Jan. 11, 1916 |
| 1,634,513 | Reed | July 5, 1927 |
| 1,701,549 | Weedon | Feb. 12, 1929 |
| 1,749,876 | Emerson | Mar. 11, 1930 |
| 2,106,924 | Guffra | Feb. 1, 1938 |

FOREIGN PATENTS

| | | |
|---|---|---|
| 203,847 | Switzerland | July 1, 1939 |
| 308,763 | Great Britain | Aug. 22, 1929 |